US008230873B2

(12) United States Patent
Martin et al.

(10) Patent No.: US 8,230,873 B2
(45) Date of Patent: Jul. 31, 2012

(54) FUEL TANK VALVE ASSEMBLY WITH ADJUSTABLE BYPASS VENT FLOW

(75) Inventors: Charles Joseph Martin, Dexter, MI (US); Emil Szlaga, Sterling Heights, MI (US)

(73) Assignee: Eaton Corporaton, Cleveland, OH (US)

( * ) Notice: Subject to any disclaimer, the term of this patent is extended or adjusted under 35 U.S.C. 154(b) by 996 days.

(21) Appl. No.: 12/206,031

(22) Filed: Sep. 8, 2008

(65) Prior Publication Data

US 2010/0059123 A1 Mar. 11, 2010

(51) Int. Cl.
*F16K 24/04* (2006.01)
(52) U.S. Cl. ........................... 137/202; 137/43
(58) Field of Classification Search .................. 137/202, 137/43, 599.01–601.21, 199, 197, 171
See application file for complete search history.

(56) References Cited

U.S. PATENT DOCUMENTS

| | | | | |
|---|---|---|---|---|
| 3,776,256 A | * | 12/1973 | Marshall | 137/202 |
| 5,028,244 A | | 7/1991 | Szlaga | |
| 5,116,257 A | * | 5/1992 | Szlaga | 137/43 |
| 5,497,800 A | * | 3/1996 | Ohashi et al. | 137/110 |
| 5,535,772 A | * | 7/1996 | Roetker et al. | 137/43 |
| 5,797,434 A | * | 8/1998 | Benjey et al. | 141/59 |
| 5,931,183 A | * | 8/1999 | Yoshihara | 137/202 |
| 5,954,082 A | * | 9/1999 | Waldorf et al. | 137/202 |
| 6,257,287 B1 | | 7/2001 | Kippe et al. | |
| 6,343,590 B1 | * | 2/2002 | Nagai et al. | 123/518 |
| 6,439,206 B1 | * | 8/2002 | Shimamura et al. | 123/516 |
| 6,591,855 B2 | * | 7/2003 | Nishi et al. | 137/202 |
| 6,612,324 B2 | | 9/2003 | Szlaga | |
| 6,701,950 B2 | * | 3/2004 | Brock et al. | 137/43 |
| 6,755,206 B2 | * | 6/2004 | Nishi et al. | 137/202 |
| 6,779,544 B2 | * | 8/2004 | Devall | 137/202 |
| 6,913,295 B2 | * | 7/2005 | Kimisawa et al. | 285/423 |
| 7,163,023 B2 | * | 1/2007 | Spink et al. | 137/202 |
| 2003/0066558 A1 | * | 4/2003 | Muto et al. | 137/202 |
| 2003/0111111 A1 | * | 6/2003 | Zorine | 137/202 |

* cited by examiner

*Primary Examiner* — Craig Schneider
*Assistant Examiner* — David Colon Morales
(74) *Attorney, Agent, or Firm* — Quinn Law Group, PLLC

(57) ABSTRACT

A valve assembly is provided that permits adjustable vent flow from the fuel tank vapor space through a bypass vent opening based on a condition in the vapor space after nozzle shutoff. The valve assembly including a first valve, also referred to as a main float, that provides rollover protection and controls venting of the vapor space prior to nozzle shut-off. A secondary closure device, also referred to as a second valve, moves independently of the first valve to control venting of the vapor space after nozzle shutoff through a bypass vent opening formed in the valve housing in response to at least one operating condition in the fuel tank outside of a chamber defined by the valve housing in which a main float moves.

12 Claims, 5 Drawing Sheets

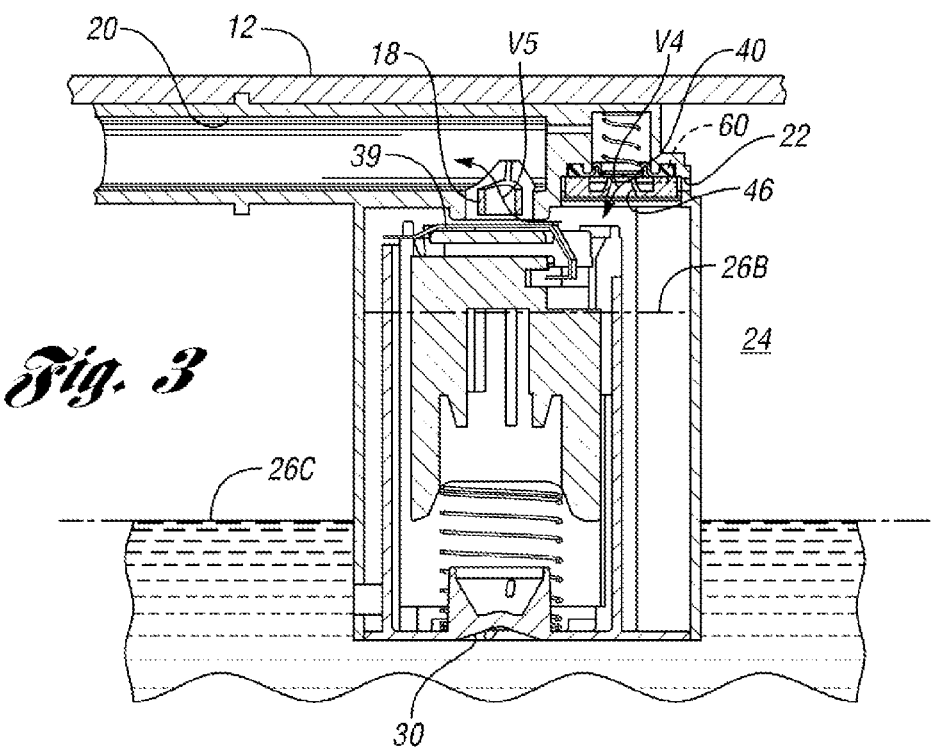
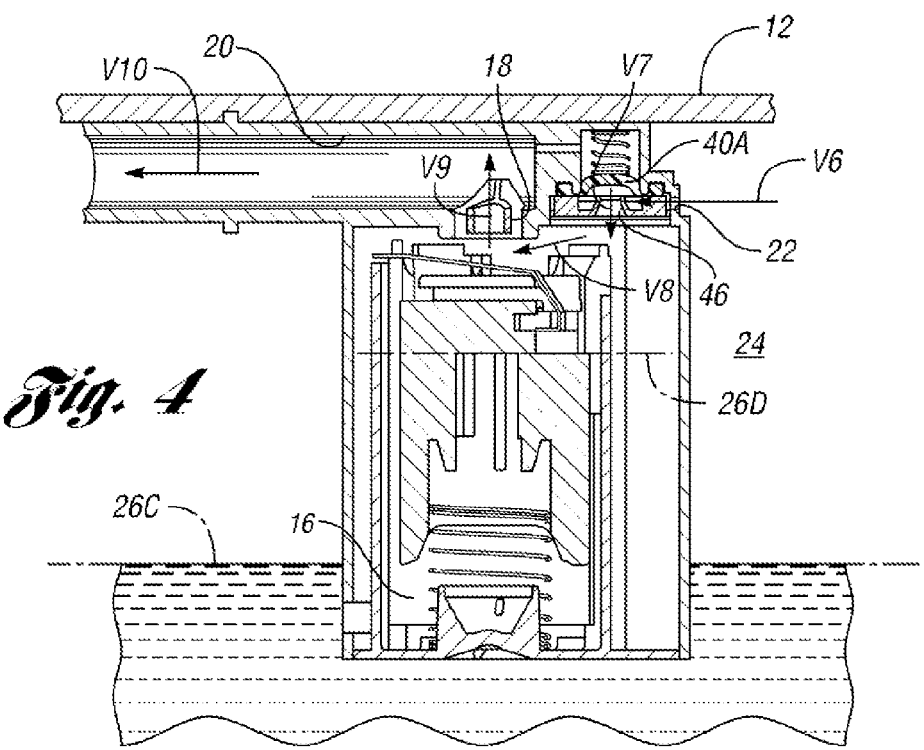

FUEL TANK VALVE ASSEMBLY WITH ADJUSTABLE BYPASS VENT FLOW

TECHNICAL FIELD

The invention relates to a valve assembly with a device configured to adjust vent flow from a fuel tank.

BACKGROUND OF THE INVENTION

Fuel tank valve assemblies that function to provide fuel nozzle shutoff once liquid reaches a predetermined level are known. A float device is often provided to accommodate shutoff by interfering with a vent passage once fuel reaches the predetermined level. Furthermore, these valve assemblies often provide rollover protection by closing liquid escape paths upon inversion of the tank. It is desirable to vent the fuel tank vapor space when the fuel level is at or above the shutoff level.

SUMMARY OF THE INVENTION

A valve assembly is provided that permits adjustable vent flow from the fuel tank vapor space through a bypass vent opening based on a condition in the fuel tank after nozzle shutoff. The valve assembly also provides rollover protection. Specifically, a valve assembly for controlling fluid communication between a vapor space of a fuel tank and a vapor outlet includes a housing defining a chamber configured to be open to the fuel tank when at least a portion of the housing is placed in the fuel tank, and further defining a vapor vent passage in fluid communication with the chamber. The chamber is in selective fluid communication with the vapor outlet through the vapor vent passage. A first valve, which may be a float-type valve referred to as a main float, is disposed in the chamber and operable for restricting venting through the vapor vent passage when fuel in the chamber reaches a predetermined level. The housing defines a bypass vent opening above the predetermined level for fluidly communicating the vapor space with the vapor vent passage.

A secondary closure device, also referred to as a second valve, is configured to move independently of the first valve to control venting of the vapor space through the bypass vent opening in response to at least one operating condition in the fuel tank outside of the chamber. The secondary closure device may be of any suitable type, such as a pressure-sensitive diaphragm responsive to a pressure differential between the vapor space and the vapor outlet, a secondary float responsive to a fuel level in the tank outside of the chamber, or both, or a motion sensitive valve. The control or adjustment of venting afforded by the secondary closure device may be proportional (i.e., the adjustment in venting is in proportion to the operating condition in the fuel tank) or binary (i.e., a first amount of venting in the absence of the operating condition, which may include a complete closure and therefore absence of venting, and a second amount of venting when the operating condition occurs). Because the secondary closure device moves independently of the first valve, the movement is directly in response to the operating condition, rather than in response to movement of the first valve. This permits the secondary control device to provide a more precise degree of control as well as flexibility of control than if the secondary control device moved indirectly, via the first valve, in response to the operating condition.

Thus, the first valve is movable in the chamber toward the vapor vent passage in response to liquid fuel in the tank (and in the chamber), whether due to filling of the tank, sloshing of fuel, orienting the tank at a grade, or due to inversion of the tank. The first valve is configured to reduce vapor flow from the tank through the vapor vent passage when the first valve moves toward the vapor vent passage. The second valve outside of the chamber is configured to move with respect to the bypass passage to vary flow through the bypass passage in response to at least one operating condition in the fuel tank outside of the chamber at which the first valve has moved to reduce vapor flow through the vapor vent passage.

The configuration of the valve assembly with first and second valves enables multiple stages of operation, with the first valve configured to permit venting from the chamber under a first set of operating conditions in the chamber, thereby establishing a first stage of the valve, and to restrict venting from the chamber under a second set of operating conditions in the chamber, thereby establishing a second stage of the valve. The second valve is configured to adjust vapor flow from the tank through the bypass vent opening in response to a different set of operating conditions in the tank outside of the chamber, thereby establishing another stage of the valve. The different operating conditions may be different fuel levels within the tank, different pressure differentials between the tank vapor space and the vapor outlet, or a combination of these conditions.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic cross-sectional illustration of the valve assembly of FIG. 1 in a third stage of operation;

FIG. 4 is a schematic cross-sectional illustration of the valve assembly of FIG. 1 in a fourth stage of operation;

DESCRIPTION OF THE PREFERRED EMBODIMENTS

Figure 1:
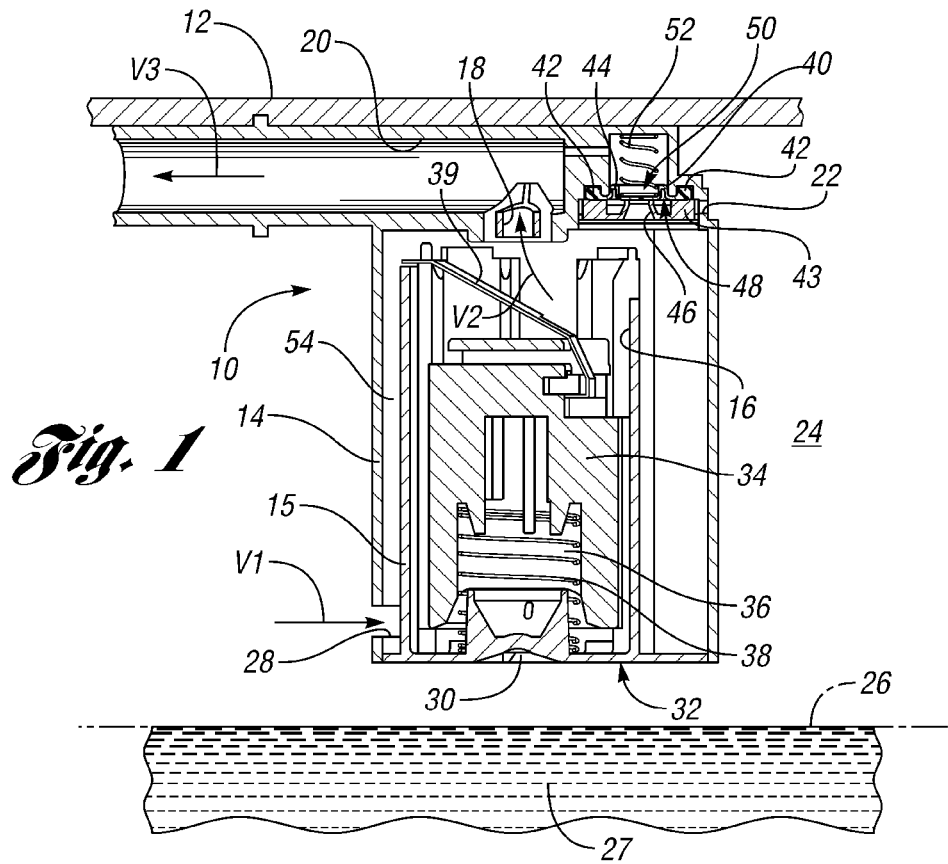
FIG. 1 is a schematic cross-sectional illustration of a valve assembly mounted to a fuel tank showing a first stage of operation.

Referring to the drawings, wherein like reference numbers refer to like components, FIG. 1 shows a multi-stage valve assembly 10 mounted to a fuel tank 12. The valve assembly 10 has a housing 14 with interior walls 15 defining an interior chamber 16. The housing 14 also defines a vapor vent passage 18, also referred to as a vent opening, which is in fluid communication with a vapor outlet 20. The vapor outlet 20 leads to a vapor recovery canister (not shown) or other destination outside of the tank 12. The housing 14 also defines a bypass vent opening 22, also referred to as a bypass passage. The bypass vent opening 22 is open to vapor space 24 in the tank 12 above a fuel level 26 of fuel 27 within the tank 12. The housing 14 also defines a vent window 28 generally near the bottom of the valve assembly 10 when the valve assembly 10 is mounted in the tank 12. The vent window 28 is positioned to admit fuel in the tank 12 into the chamber 16 when the fuel level rises below the bottom surface 32 of the housing 14 and at least to the level of the window 28, such as when fuel is added to the tank 12 or during sloshing, positioning the tank 12 on a grade, or during inversion of the tank 12. The housing 14 has small drain holes (not shown) extending through the depression 30 to the bottom surface 32. Although shown as a unitary molded component, the housing 14 may be several integrated components, and may be made of any suitable material, such as plastic or aluminum.

The valve assembly 10 includes a main float 34, also referred to as a first valve, disposed in the chamber 16. The main float 34 is buoyant in liquid fuel 27, and includes a cavity 36 that is normally filled with vapor, and may fill with liquid fuel when the tank 12 is inverted. The cavity 36 is also part of the chamber 16. A spring 38 positioned between the main float 34 and the housing 14 biases the main float 34 toward the vapor vent passage 18. A ribbon seal 39 is secured on one end to the interior wall 15 of the housing 14 and at another end to the main float 34. As the main float 34 rises in the chamber 16 due to contact with liquid fuel, the main float 34 pushes the ribbon seal 39 against the vapor vent passage 18 to restrict venting of vapor or leakage of fuel through the vapor vent passage 18. This scenario is illustrated with respect to FIG. 2, and is discussed further below. It should be appreciated that the construction of the ribbon seal 39, the main float 34, and the housing 14 may be designed to control the amount of venting, if any, through the vapor vent passage 18 when the float 34 pushes the seal 39 against the passage 18. For example, the float 34 may be designed to toggle between the closed position of FIG. 2 and a slightly opened position due to motion of the fuel, allowing limited venting past the vapor vent passage 18, as illustrated by arrow V5 of FIG. 3, even when the diaphragm 40, discussed below, is closed. Alternatively, the seal 39, float 34 and housing 14 could be designed to substantially prevent any venting through passage 18 when the seal 39 is pressed against the housing 14.

The valve assembly 10 further includes a secondary closure device 40, also referred to as a second valve, which in this embodiment is a pressure-sensitive diaphragm, and will be referred to as such. The pressure-sensitive diaphragm 40 has a fixed outer diameter seal portion 42 sealed to a portion 43 of the housing 14. A dynamic inner diameter seal portion 44 is selectively sealed to the portion 43 to prevent vapor flow from the vapor space 24 through the bypass vent opening 22 to the chamber 16 through the central opening 46. One side 48 of the diaphragm 40 is exposed to the vapor space 24 via the bypass vent opening 22. The other side 50 of the diaphragm 40 is exposed to pressure in the vapor outlet 20, which is substantially atmospheric or ambient pressure. A spring 52 biases the diaphragm 40 to a closed position, and is configured with a spring force that is overcome by an opposing force on the diaphragm 40 resulting from a preselected pressure differential between the vapor space 24 and the vapor outlet 20.

In FIG. 1, the relationship of the fuel level in the tank 12 relative to the housing 14 establishes a first set of operating conditions affecting the position of the main float valve 34 and the pressure-sensitive diaphragm 40. The operation of the valve assembly 10 in response to these conditions may be considered a first stage of the valve assembly 10. Specifically, fuel level 26 is a first fuel level below the window 28 of the housing 14, and represents a fuel level at less than full, such as before or during filling. At such a fuel level, the vapor space 24 is in direct fluid communication with the window 28. The main float 34 is not restricting flow through the vapor vent passage 18. The pressure-sensitive diaphragm 40 is likely closed, as a predetermined pressure differential between the vapor space 24 and the vapor outlet 20 may not be present. Thus, as represented by arrow V1, vapor can vent from the vapor space 24 through the window 28, and through the annulus 54 between the outer walls of housing 14 and inner walls 15. Baffles (not shown) formed by the housing 14 and interior walls 15 may be positioned throughout the annulus 54 to separate any entrained liquid fuel from the vapor. The annulus 54 is open to the upper portion of the chamber 16 above the main float 34, through another window, not shown, in the inner walls 15. Thus, the vapor vents through the vapor vent passage 18, as represented by arrow V2, and out through the vapor outlet 20, as represented by arrow V3.

Figure 2:
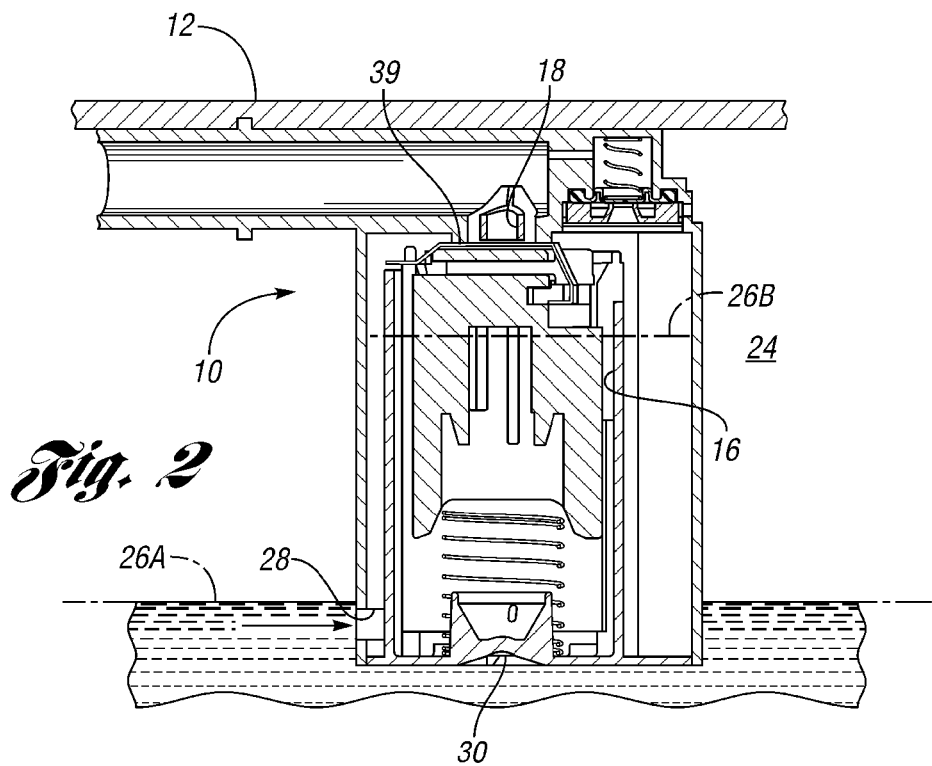
FIG. 2 is a schematic cross-sectional illustration of the valve assembly of FIG. 1 in a second stage of operation.

Referring to FIG. 2, the relationship of the fuel level in the tank 12 relative to the housing 14 establishes a second set of operating conditions affecting the position of the main float valve 34 and the pressure-sensitive diaphragm 40. The operation of the valve assembly 10 in response to these conditions may be considered a second stage of the valve assembly 10. Specifically, fuel level 26A has risen due to filling of the tank 12 to cover the window 28. With no vapor vent flow through the window 28, the vapor pressure in the vapor space 24 of the tank 12 causes fuel to rise inside the chamber 16 (through window 28) to fuel level 26B, elevating the main float 34, which presses the ribbon seal 39 against the vapor vent passage 18.

Referring to FIG. 3, the fuel level 26C in the tank 12 has risen slightly above the shutoff level 26A of FIG. 2. Fuel level in the chamber is fuel level 26B, the same as in FIG. 2. The main float 34 is elevated, pressing the ribbon seal 39 against the vapor vent passage 18. FIG. 3 represents a third set of operating conditions in which pressure in the vapor space 24 has risen above pressure levels associated with the second set of operating conditions, such as due to continued filling of the tank beyond nozzle shutoff. The pressure in the vapor space 24 is not high enough to establish the predetermined pressure differential at which the diaphragm 40 opens. However, the housing 14 is formed with a slight notch 60 that permits some venting from the vapor space 24, through the central aperture 46, as represented by arrow V4. Thus, some restricted, low pressure venting of the vapor space 24 is accomplished during the third set of operating conditions, establishing a third stage of the valve assembly 10. For example, if the pressure in the vapor space 24 is approximately 2 kPa at nozzle shutoff, the third stage may allow the restricted venting until a predetermined pressure differential, which may be at about 4 kPa pressure in the vapor space, causes the diaphragm 40 to open. Alternatively, the housing 14 could be designed without the notch 60, in which case no venting of the vapor space 24 through the valve assembly 10 would occur during the third set of operating conditions.

Referring to FIG. 4, the fuel level in the tank is fuel level 26C, the same as in FIGS. 2 and 3. FIG. 4 represents a fourth set of operating conditions in which pressure in the vapor space 24 has risen above pressure levels associated with the second and third sets of operating conditions, and the predetermined pressure differential between the vapor space 24 and the vent outlet 20 is reached, causing the diaphragm 40 to lift to an opened position in which it is indicated as 40A. The predetermined pressure differential may be associated with pressures in the tank 12 above a certain pressure, such as 4 kPa. Thus, substantial venting of the vapor space 24 is accomplished through the bypass vent opening 22, as represented by arrow V6, past the lifted diaphragm 40A and through central opening 46, as represented by arrow V7. The opening of the diaphragm valve 40 allows pressure to increase within the chamber 16, causing the fuel level in the chamber 16 to drop slightly to level 26D, and the main float 34 to therefore also drop slightly, permitting the vented vapor that passed through the bypass opening 22 to also pass through the vapor vent passage 18 and the outlet 20, as illustrated by arrows V8, V9 and V10.

Figure 5:
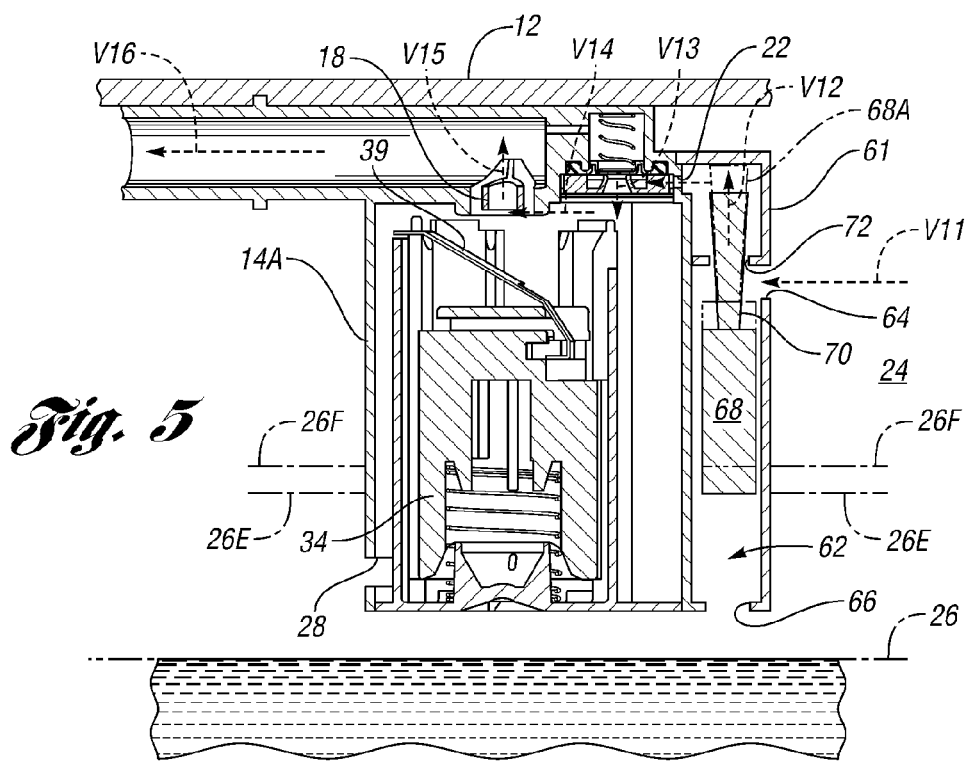
FIG. 5 is a schematic cross-sectional illustration of a second embodiment of a valve assembly.

Referring to FIG. 5, an alternative second embodiment of a multi-stage valve assembly 10A is shown. The multi-stage valve assembly 10A has many components and features identical to those of valve assembly 10, and identical reference numbers are used to refer to identical components and features. The valve assembly 10A includes a housing 14A formed with an extension 61 defining an auxiliary chamber 62. The extension 61 has a side opening 64 in communication with vapor space 24 and a bottom opening 66 open to fuel in the tank 12. A secondary float 68 is supported in the auxiliary chamber 62 and includes a needle valve portion 70 configured to selectively interfere with a float opening 72 within the chamber 62.

When fuel is at fuel level 26, the main float 34 is in the position shown, with the ribbon valve 39 not blocking vapor venting through window 28 and vapor vent passage 18. The secondary float 68 is in the position shown, with the needle valve portion 70 substantially or completely restricting vent flow through the side opening 64 and bypass vent opening 22. Thus, the vapor space 24 is substantially or completely prevented from venting through the bypass opening 22 via the diaphragm 40.

When fuel level in the tank 12 rises to levels above the window 28 and up to fuel level 26E, fuel within the chamber 16 rises even higher, causing the main float 34 to rise to the position shown in FIGS. 2 and 3, and the secondary float 68 stays in the position shown in FIG. 5. If fuel level in the tank 12 outside of the chamber 16 rises above the predetermined fuel level 26E, such as to fuel level 26F, the secondary float 68 is buoyed upward to the position shown in phantom indicated as 68A. The tapered nature of the needle valve portion 70 thus allows venting of the vapor space 24 through float opening 72 and bypass opening 22. The vapor passes the diaphragm 40 either via a notch 60 as described above, or if the pressure differential is sufficient, by lifting the diaphragm 40 to position 40A of FIG. 4, and then past the main float 34 and ribbon seal 39, if the float 34 is biased downward to the position shown in FIG. 4 via the vapor pressure. Thus, the secondary float 68 with needle valve portion 70 and the diaphragm 40 acts in series with one another to affect venting of the vapor space 24 through the bypass opening 22 as represented by arrows V11, V12, V13, V14, V15 and V16.

Figure 6:
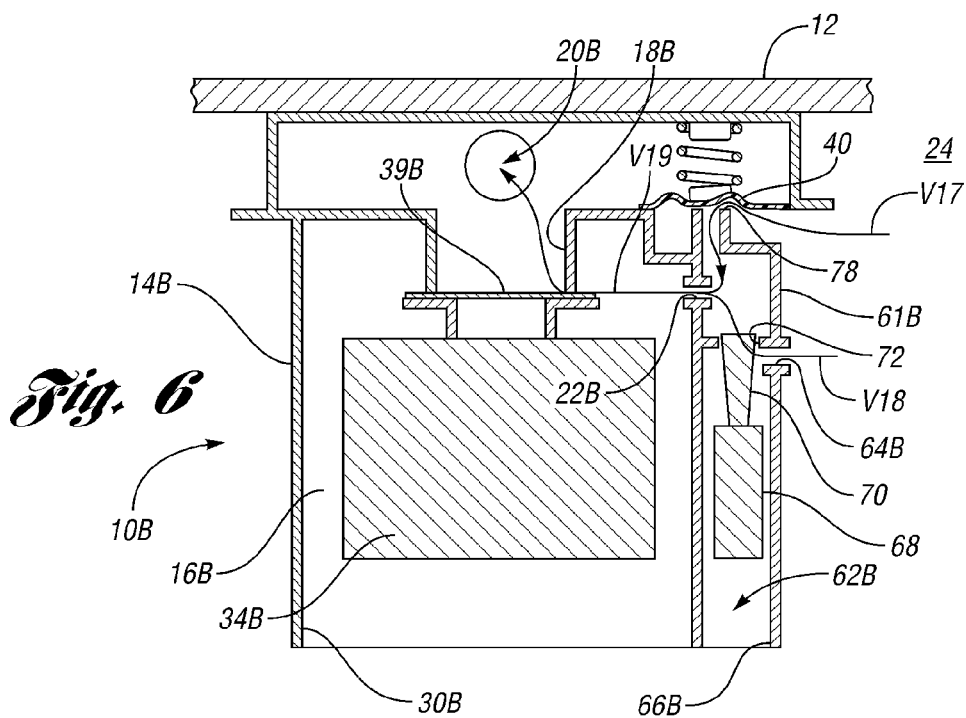
FIG. 6 is a schematic cross-sectional illustration of a third embodiment of a valve assembly.

Referring to FIG. 6, another alternative third embodiment of a multi-stage valve assembly 10B is shown. The multi-stage valve assembly 10B has many components and features identical to those of valve assemblies 10 and 10A, and identical reference numbers are used to refer to identical components and features. The valve assembly 10B includes main float 34B with a seal 39B that may be a ribbon seal such as ribbon seal 39 of FIGS. 1-5, or a seal secured at both ends to the float 34B for movement with the float 34. The valve assembly 10B includes a housing 14B defining a main chamber 16B and formed with an extension 61B defining an auxiliary chamber 62B. The main chamber 16B is directly open to the fuel level in the tank 12 at bottom depression 30B.

When fuel level rises above the bottom depression 30B, venting of the vapor space 24 through the bottom depression 30B ceases. The extension 61B has a side opening 64B in communication with vapor space 24 and a bottom opening 66B open to fuel in the tank 12. A secondary float 68 is supported in the auxiliary chamber 62B and includes a needle valve portion 70 configured to selectively interfere with float opening 72 within the chamber 62B.

The housing 14B includes a separate opening 78 communicating pressure in vapor space 24 with the diaphragm 40. The secondary float 68, needle valve 70 and diaphragm 40 operate as described with respect to FIG. 5, except that rather than being in series with one another, they operate in parallel to affect vent flow through the vent opening 22B. Venting of the vapor space 24 past the diaphragm 40 is in response to a predetermined pressure differential between the pressure of the vapor space 24 and the pressure at the vapor vent outlet 20, which act on opposite sides of the diaphragm 40. Venting of the vapor space 24 past the secondary float 68 and needle valve portion 70 through opening 64B and past float opening 72 is in response to fuel level in the tank 12 outside of the chamber 16B. Thus, venting of the vapor space 24 past the diaphragm 40, as represented by arrow V17, is independent of venting of vapor space 24 past the secondary float 68 with needle valve portion 70, as represented by arrow V18, with either or both sources of vapor venting combining at the bypass vent opening 22B to vent past the vapor vent passage 18B and out through the vapor outlet 20B, as represented by arrow V19.

Figure 7:
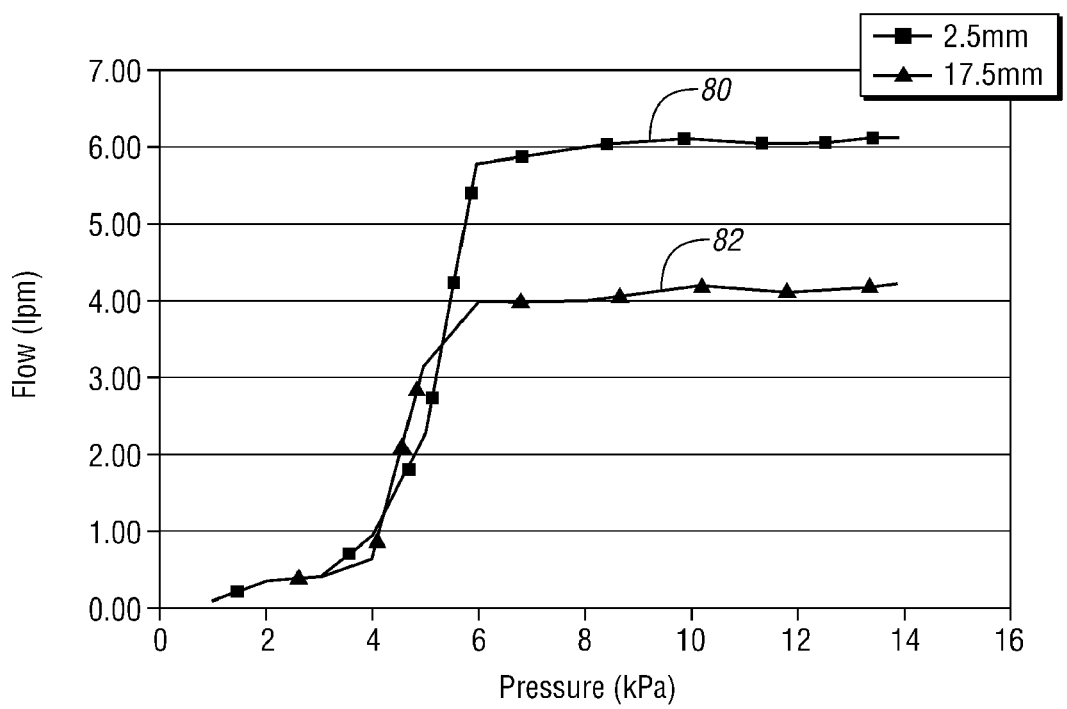
FIG. 7 is a plot of vapor vent flow (liters per minute) versus tank vapor space pressure (kilopascals) through a valve assembly similar to that of FIGS. 1-4, but having an open bottom rather than a vent window at various fuel levels.

Referring to FIG. 7, vapor vent flow in liters per minute (lpm) versus pressure (kPa) through a valve assembly similar to the valve assembly 10A of FIGS. 1-4 but having an open bottom to permit fuel into a chamber that houses the main valve, rather than having a vent window like window 28 and a depression like depression 30 with drain openings a relatively large fuel inlet opening. The vapor vent flow in the valve tested is via vapor flow from a vapor space like the vapor space 24 past a bypass opening like the bypass opening 22 and a diaphragm like diaphragm 40. The flow is shown for various levels of fuel in the tank 12 above the bottom opening of the housing. A first curve 80 represents performance of the valve assembly with fuel level in the tank at 2.5 mm above the bottom opening. Curve 82 represents performance of the valve assembly with fuel level in the tank at 17.5 mm above the bottom opening. The curves 80 and 82 indicate that the diaphragm opens to adjust vapor vent flow from the vapor space at about 4 kPa in the vapor space, which corresponds with the predetermined pressure differential between the vapor space and the vapor outlet at which the diaphragm is configured to open. With the addition of the diaphragm, venting from the vapor space 24 is made to increase as pressure increases (i.e., venting is greater at or above 4 kPa than when pressure is below 4 kPa). The valve assembly 10A of FIGS. 1-4 is expected to provide vapor vent flow in a generally similar manner as illustrated by curves 80, 82.

Figure 8:
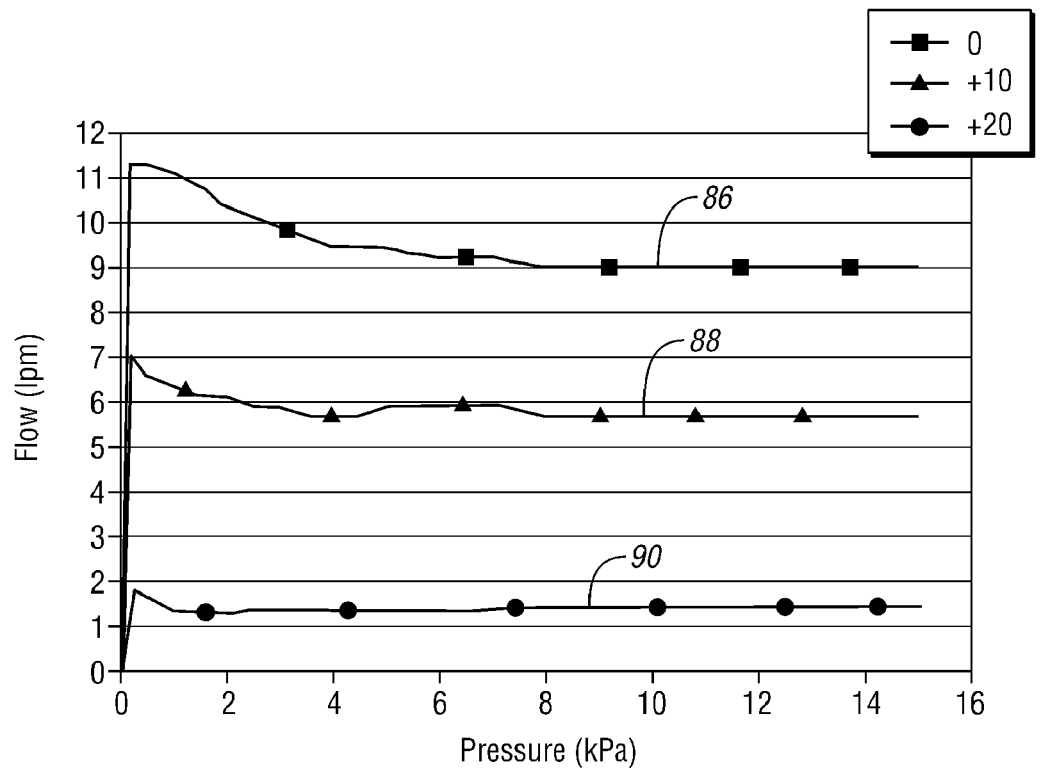
FIG. 8 is a plot of vapor vent flow (liters per minute) versus tank vapor space pressure (kilopascals) through a valve assembly having a bypass opening but no secondary closure device at various liquid heights above an initial shutoff level.

FIG. 8 illustrates the performance of a valve assembly substantially identical to valve assembly 10, having a bypass vent opening, but not having a secondary closure device. Venting of the vapor space through the bypass opening occurs without control or adjustment by a secondary closure device. A first curve 86 represents performance of the valve assembly with fuel level in the tank level with a bottom opening in the valve assembly, i.e., generally at the point of nozzle shutoff. Second curve 88 represents performance of the valve assembly with fuel level in the tank at 10 mm above the bottom opening in the valve assembly. Third curve 90 represents performance of the valve assembly with fuel level in the tank at 20 mm above the bottom opening in the valve assembly. Curves 86, 88 and 90 generally illustrate the phenomena of steady state vapor vent flow from the vapor space after nozzle shutoff through a constantly open bypass opening. These types of curves are generally flat, but may have a slight positive or negative slope depending on the precise conditions required to maintain flow equilibrium at each pressure. The curves indicate that flow is not constrained prior to reaching a threshold pressure, unlike curves 80 and 82 of FIG. 7. Curves 80 and 82 described above with respect to FIG. 7 constrain vapor vent flow prior to the predetermined pressure differential at 4 kPa. Thus, a secondary closure device as described herein, such as diaphragm 40, modifies the vapor vent flow performance relative to a valve assembly with no secondary closure device and therefore no bypass venting adjustment or control.

Figure 9:
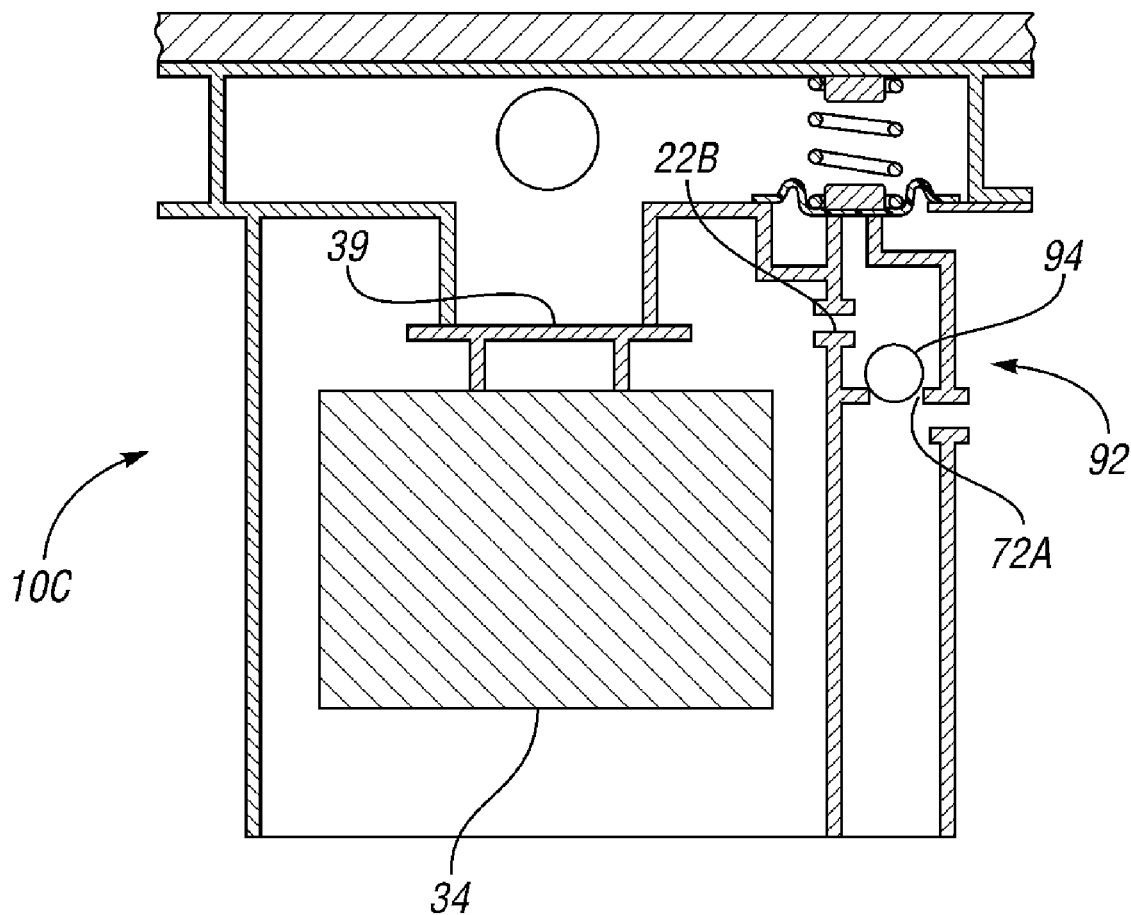
FIG. 9 is a schematic cross-sectional illustration of a fourth embodiment of a valve assembly.

Referring to FIG. 9, another embodiment of a multi-stage valve assembly 10C is shown. Valve assembly 10C is alike in all aspects to valve assembly 10B of FIG. 6, and functions the same as valve assembly 10B, with the exception that the secondary float 68 with needle valve portion 70 is replaced by a motion sensitive valve 92. The motion sensitive valve 92 is depicted as a simple ball valve that rests atop the opening 72A. When fuel tank 12 is in motion (i.e., when a vehicle to which tank 12 is mounted is in motion), the ball 94 moves off of the opening 72, permitting flow through opening 72A and bypass vent opening 22B.

While the best modes for carrying out the invention have been described in detail, those familiar with the art to which this invention relates will recognize various alternative designs and embodiments for practicing the invention within the scope of the appended claims.

The invention claimed is:

1. A valve assembly for controlling fluid communication between a vapor space of a fuel tank and a vapor outlet, comprising:
   a housing defining a chamber configured to be open to the tank when at least a portion of the housing is placed in the fuel tank, and further defining a vapor vent passage in fluid communication with the chamber; wherein the chamber is in selective fluid communication with the vapor outlet through the vapor vent passage;
   a main float disposed in the chamber and operable to move to a position in which the main float restricts venting through the vapor vent passage when fuel in the chamber reaches a predetermined level;
   wherein the housing defines a bypass vent opening that connects the vapor space to the vapor outlet through the vapor vent passage; wherein the bypass vent opening is above the predetermined level;
   a second float exposed to fuel in the fuel tank outside of the chamber and movable independently of the main float to control venting of the vapor space through the bypass vent opening to the vapor vent passage in response to at least one operating condition in the fuel tank outside of the chamber;
   a pressure-sensitive diaphragm sealingly mounted to the housing around an aperture in the housing in exposure to the vapor space on one side and to the vapor outlet on an opposing side and movable in response to a predetermined pressure differential between the vapor space and the vapor outlet to permit venting of the vapor space through the bypass vent opening to the aperture and then to the vapor vent passage, the pressure-sensitive diaphragm thereby adjusting venting from the vapor space in response to the predetermined pressure differential; and
   wherein the housing is configured with a notch; said notch establishing fluid communication between the bypass vent opening and the aperture when the pressure differential is less than the predetermined pressure differential and the diaphragm is not moved, thereby permitting venting through the bypass vent opening to the aperture and then to the vapor vent passage.

2. The valve assembly of claim 1, wherein the at least one operating condition is fuel level in the fuel tank outside of the chamber; wherein the housing defines a float opening aligned with the second float and in fluid communication with the bypass vent opening; and wherein the second float modifies vapor vent flow through the float opening in correspondence with the fuel level in the fuel tank outside of the chamber.

3. The valve assembly of claim 1, wherein the at least one operating condition is fuel level in the tank outside of the chamber.

4. A valve assembly for a fuel tank comprising:
   a valve housing mounted to the fuel tank and defining a chamber with a vapor vent passage in communication with a vapor outlet and further defining a bypass passage connecting the chamber and the fuel tank outside of the chamber;
   a first valve movable in the chamber toward the vapor vent passage in response to liquid fuel in the tank and configured to reduce vapor flow from the tank through the vapor vent passage when the first valve moves toward the vapor vent passage;
   a second valve mounted with respect to the bypass passage at least partially outside of the chamber and configured to move independently of the first valve to vary vapor flow through the bypass passage in response to at least one operating condition in the fuel tank outside of the chamber at which the first valve has moved to reduce vapor flow through the vapor vent passage;
   wherein the at least one operating condition is a predetermined pressure differential between the vapor space and the vapor outlet;
   wherein the second valve is a pressure-sensitive diaphragm sealingly mounted to the housing around an aperture in the housing in exposure to vapor space in the fuel tank on one side and to the vapor outlet on an opposing side and movable in response to the predetermined pressure differential between the vapor space and the vapor outlet to increase venting of the vapor space through the bypass passage to the aperture and then to the vapor vent passage, the pressure-sensitive diaphragm thereby adjusting venting from the vapor space in response to the predetermined pressure differential; and
   wherein the housing is configured with a notch; said notch establishing fluid communication between the bypass passage and the aperture when the pressure differential between the vapor space and the vapor outlet is less than the predetermined pressure differential and the diaphragm is not moved, thereby permitting venting through the bypass passage to the aperture and then to the vapor vent passage.

5. The valve assembly of claim 4, further comprising:
   a float configured to move toward the bypass passage in response to a predetermined fuel level in the tank outside of the chamber.

6. The valve assembly of claim 5, wherein the predetermined fuel level in the tank outside of the chamber is lower than a predetermined liquid level inside of the chamber at which the first valve reduces vapor flow through the vapor vent passage.

7. The valve assembly of claim 4, further comprising:
a float exposed to fuel in the fuel tank outside of the chamber; wherein the housing defines a float opening aligned with the float and in fluid communication with the bypass passage; and wherein the float modifies vapor vent flow through the float opening in correspondence with fuel level in the tank outside of the chamber.

8. A multi-stage valve assembly for use with a fuel tank for controlling fluid communication from the fuel tank to a vapor outlet, comprising:
a housing defining a chamber, a vent opening at the chamber and a bypass vent opening; wherein the chamber and the bypass vent opening are in fluid communication with a vapor space of the tank when at least a portion of the housing is mounted to the tank; wherein the bypass vent opening extends through the housing and is configured to connect the vapor space of the fuel tank to the vent opening at the chamber;
a first valve within the chamber configured to permit venting from the chamber through the vent opening at the chamber under a first set of operating conditions in the chamber, thereby establishing a first stage of the first valve, and to restrict venting from the chamber through the vent opening at the chamber under a second set of operating conditions in the chamber, thereby establishing a second stage of the first valve;
a second valve configured to move independently of the first valve to adjust vapor flow from the vapor space of the tank through the bypass vent opening to the vent opening at the chamber in response to a different set of operating conditions in the tank outside of the chamber; and wherein the valve assembly is configured such that vapor flow through the bypass vent opening acts on the first valve to cause the first valve to allow additional vapor flow from the second valve to the vapor outlet when the second valve adjusts the vapor flow.

9. The multi-stage valve of claim 8, wherein the first set of operating conditions include a first fuel level below the chamber; and wherein the second set of operating conditions include a second fuel level in the chamber higher than the first fuel level.

10. The multi-stage valve assembly of claim 8, wherein the different set of operating conditions is a range of fuel levels in the tank outside of the chamber higher than the first fuel level.

11. The valve assembly of claim 8, wherein the different set of operating conditions is a predetermined pressure differential between the vapor space and the vapor vent outlet; and
wherein the second valve is a pressure-sensitive diaphragm sealingly mounted to the housing around an aperture in the housing in exposure to vapor space in the fuel tank on one side and to the vapor outlet on an opposing side and movable in response to the predetermined pressure differential between the vapor space and the vapor outlet to increase venting of the vapor space through the bypass vent opening to the aperture and then to the vent opening in the chamber, the pressure-sensitive diaphragm thereby adjusting venting from the vapor space in response to the predetermined pressure differential.

12. The valve assembly of claim 11, wherein the housing is configured with a notch; said notch establishing fluid communication between the bypass vent opening and the aperture when the pressure differential is less than the predetermined pressure differential and the diaphragm is not moved, thereby permitting venting through the bypass vent opening to the aperture and then to the vent opening in the chamber.

* * * * *